Figure 3:
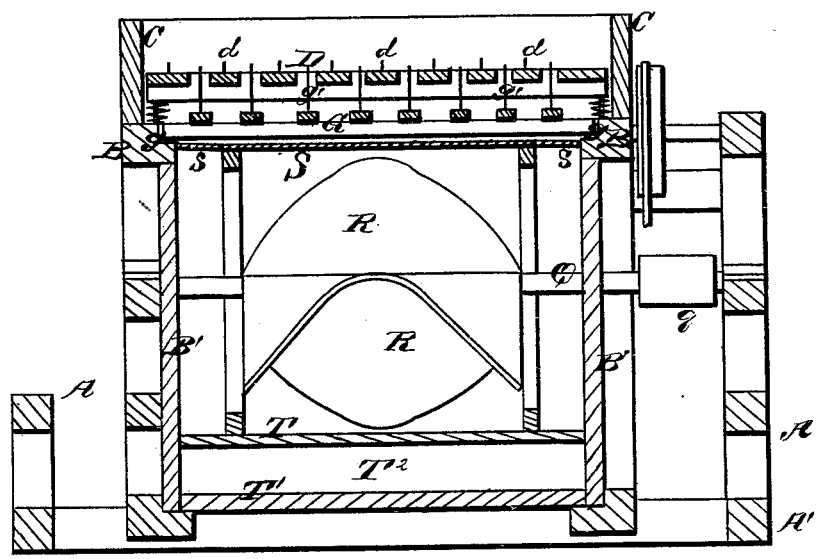

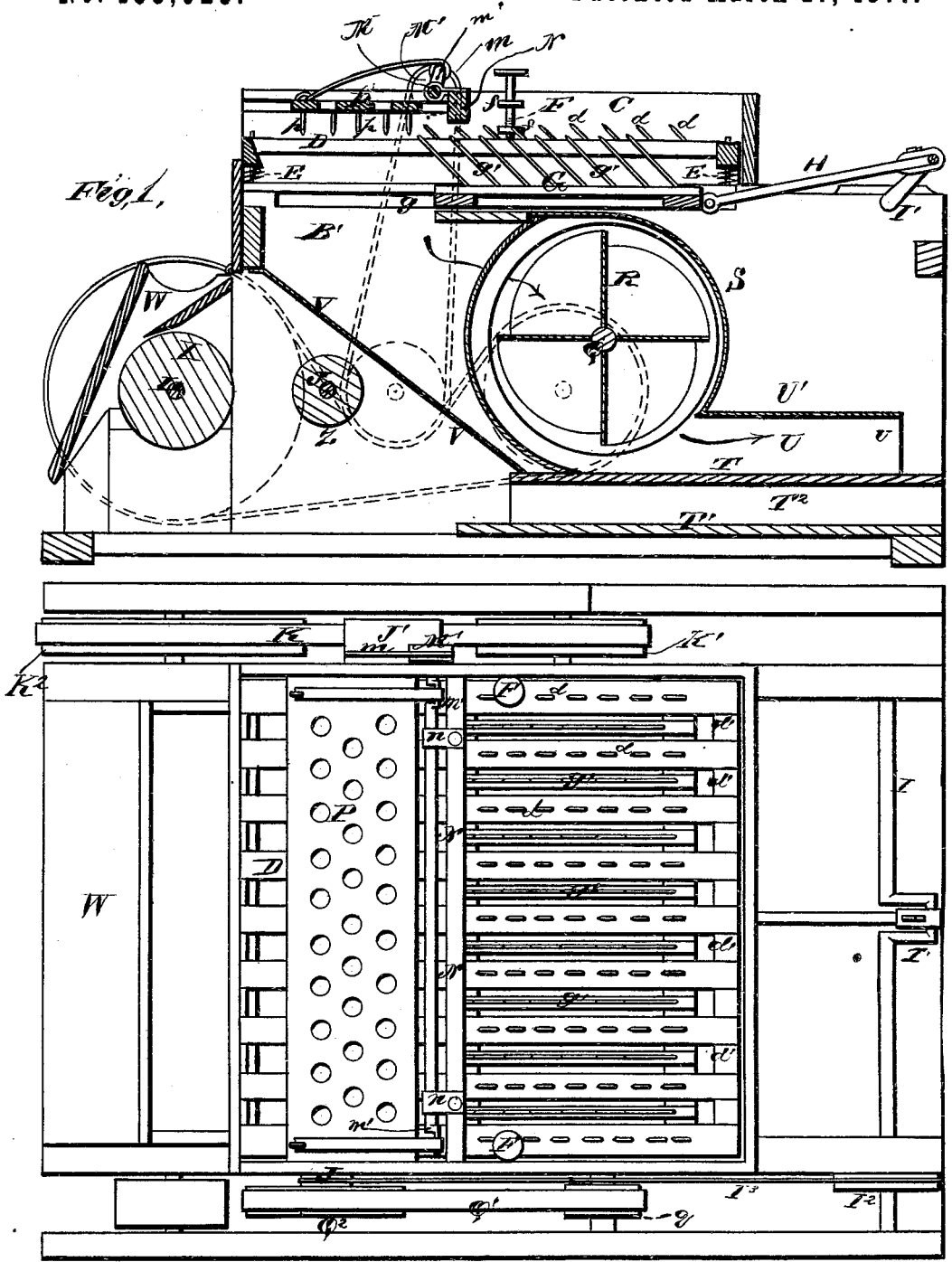

G. W. McCAULEY.
COTTON-GIN FEEDER AND CLEANER.

No. 188,928. Patented March 27, 1877.

WITNESSES
E. H. Bates.
George E. Upham.

INVENTOR.
George W. McCauley.
Gilmore, Smith & Co.
ATTORNEYS.

UNITED STATES PATENT OFFICE.

GEORGE W. McCAULEY, OF PLEASANT PLAINS, ARKANSAS.

IMPROVEMENT IN COTTON-GIN FEEDERS AND CLEANERS.

Specification forming part of Letters Patent No. 188,928, dated March 27, 1877; application filed November 4, 1876.

*To all whom it may concern:*

Be it known that I, GEO. W. McCAULEY, of Pleasant Plains, in the county of Independence and State of Arkansas, have invented a new and valuable Improvement in Cotton-Feeders and Cleaners for Cotton-Gins; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my cotton-gin, and Fig. 2 is a plan view of the same. Fig. 3 is a transverse vertical sectional view thereof.

This invention relates to feeders and cleaners for cotton-gins; and it consists in the construction and arrangement of certain devices, hereinafter particularly described.

In the annexed drawings, A designates a low outer frame, open at the front and back, in which the operating-shafts hereinafter described are journaled. B designates a higher inner frame, which is supported on the same sill A' with the said outer frame A, and incloses or supports most of the operating parts of the apparatus. The sides of said frame B, and also the upper part of the front thereof, are closed by a housing, B'. The rear of frame B is open.

On top of frame B is secured a horizontal frame, C, which is open at the front. Within this horizontal frame C is a longitudinally-slotted platform, D, which rests upon springs E E on top of frame B. Said slotted platform D is vertically adjustable by means of screw-threaded rods F F, which pass through screw-tapped lugs or plates $ff$ secured to the inside of said horizontal frame C, and bear against the top of said platform on each side thereof. Platform D is fixed as regards longitudinal and lateral motion, and is provided on its surface with rows of forwardly-inclined tines $d$ $d$. Underneath said platform a similar slotted platform or carrier, G, reciprocates longitudinally in guideways $g$ $g$, formed in the top of supporting-frame B. Said slotted reciprocating frame is provided with forwardly-inclined tines $g'$ $g'$, which are arranged alternately with tines $d$ $d$, and extend up through slots $d'$ in platform D. The adjustability of said platform D by the means above described enables the operator to regulate the degree of exposure of said lower tines $g'$ $g'$. The feed-hopper (not shown) is located directly above said platform D, so that the adjustment of said platform also regulates the lightness or heaviness of the feed of cotton which is carried forward by tines $g'$ $g'$. Alternate fixed tines $d$ $d$ prevent any of the cotton from being brought back in the reverse motion of reciprocating feeding platform or slide G, carrying said tines $g'$ $g'$.

The reciprocating motion of said feeding-slide is produced by a pitman, H, which is operated by a double crank, $I^1$, on a shaft, I, which is journaled on the top of frame B, at the rear thereof. Said shaft carries a pulley, $I^2$, which derives motion, through endless belt or chain $I^3$, from brush-cylinder shaft J, which is journaled in frame A, near the lower front corners thereof. The other end of shaft J carries a drum, J', which derives motion from an endless belt, K, which passes over two pulleys, $K^1$ and $K^2$. Pulley $K^1$ is journaled between frames A and B, and pulley $K^2$ is fixed on saw-cylinder shaft L, which is arranged in front of and below brush-cylinder shaft J. Said shaft L is also the driving-shaft of the entire apparatus.

Drum J' communicates motion by means of an endless band, $m$, or its equivalent, to a small pulley, M', on a shaft, M. Said shaft M is journaled in one side of horizontal frame C, and in brackets $n$ $n$, secured to a cross-piece, N, extending across said frame near the front thereof. Said shaft M is provided with cranks $m'$ $m'$, which operate small arms $p$ $p$, so as to give a backward and forward reciprocating motion to a perforated card, P, over the front part of frame C. Said card is provided on its under side with vertical tines or teeth $p'$ $p'$. The reciprocating motion of said card is very rapid, and subjects the cotton to violent agitation as said cotton is fed forward under it by feeding platform or carrier G. The result of this agitation is, that dust and other impurities are separated from the cotton, so as to be readily drawn downward by the following exhausting apparatus:

Q is a shaft, journaled in frames A and B, and carrying an exhaust-fan, R, arranged within frame B, and below feeding platform or carrier G. Said shaft is provided with a drum, $q$, and receives motion by belt $Q^1$ from a pulley, $Q^2$, on the brush-cylinder shaft, already described. S designates a curved metal shell, which, in front, extends across from side to side of frame B, so as to constitute, together with housings B' B', a complete and unbroken protecting casing for fan R. The rear part of said shell, as shown in Fig. 3, does not extend to said housings on either side, and so readily allows the air to be drawn down to said fan through the perforated card P, slotted platform D, and slotted carrier G. Shell S is preferably constructed in three pieces — a cylindrical, or nearly cylindrical, center sheet and two curved side bands, $s\ s$ — which fill out the space in front between said middle piece and the housings B'. Said shell is supported upon a false bottom, T, between which and the real bottom $T^1$ of the gin frame or casing is a broad space or passage, $T^2$. The dust drawn down by fan R is expelled through a rear exit-passage, U, formed by two longitudinal bars, $u\ u$, on said false bottom T, and a plate, U', supported on said bars. Said exit-passage opens at the back of the apparatus, so as to deposit the dust in any convenient receptacle without interfering with the operation of any other part of the machine. The dust is prevented from escaping in front by a partition, V, which extends obliquely upward and forward from said false bottom to the casing or housing which covers the upper part of the front of frame B.

The cotton, as it is delivered from above by the carrier G, is conducted to a hopper or feed-board of a cotton-gin. The parts indicated by letters of reference W, X, and Z are well-known parts of a saw cotton-gin; hence they are not fully shown, and need not be particularly described.

What I claim as new, and desire to secure by Letters Patent, is—

1. The combination of a vertically-adjustable slotted platform, D, with reciprocating platform or cotton-carrier G, substantially as set forth.

2. In combination with platform D and perforated lugs $f\ f$, the supporting-springs E E, screw-threaded rods F F, and carrier G, substantially as set forth.

3. In combination with a fixed slotted platform, a reciprocating platform or carrier and an agitating-card, P, provided with vertical teeth or tines $p'\ p'$, substantially as and for the purpose set forth.

4. The combination, substantially as hereinbefore described, of a perforated agitating-card, P, a fixed slotted platform, D, having inclined teeth, a reciprocating slotted platform or carrier, G, with inclined teeth, and an air-exhausting apparatus, substantially as and for the purpose set forth.

In testimony that I claim the above I have hereunto subscribed my name in the presence of two witnesses.

GEO. W. McCAULEY.

Witnesses:
GEO. L. CHEEK,
J. C. OVERSTREET.